US008109335B2

(12) United States Patent  
Luo et al.

(10) Patent No.: US 8,109,335 B2  
(45) Date of Patent: Feb. 7, 2012

(54) DEGRADABLE DIVERTING AGENTS AND ASSOCIATED METHODS

(75) Inventors: Hongyu Luo, Duncan, OK (US); Dwight D. Fulton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 243 days.

(21) Appl. No.: 12/501,881

(22) Filed: Jul. 13, 2009

(65) Prior Publication Data

US 2011/0005761 A1  Jan. 13, 2011

(51) Int. Cl.
*E21B 33/138* (2006.01)
*E21B 43/26* (2006.01)
*E21B 43/27* (2006.01)
*C09K 8/035* (2006.01)
*C09K 8/487* (2006.01)
*C09K 8/76* (2006.01)

(52) U.S. Cl. ........ 166/281; 166/282; 166/283; 166/294; 166/295; 166/307; 166/308.2; 166/308.6; 166/309; 175/72; 507/131; 507/138; 507/244; 507/265; 507/922; 507/933

(58) Field of Classification Search .................... None
See application file for complete search history.

(56) References Cited

U.S. PATENT DOCUMENTS

| | | | |
|---|---|---|---|
| 3,724,549 A | 4/1973 | Dill | |
| 3,998,272 A | 12/1976 | Maly | |
| 4,157,116 A | 6/1979 | Coulter | |
| 4,261,421 A | 4/1981 | Watanabe | |
| 4,527,628 A | 7/1985 | Dill et al. | |
| 4,986,355 A | 1/1991 | Casad et al. | |
| 5,028,146 A | 7/1991 | Wada | |
| 6,367,548 B1 | 4/2002 | Purvis et al. | |
| 6,494,263 B2 | 12/2002 | Todd | |
| 6,557,630 B2 | 5/2003 | Harkins et al. | |
| 6,737,385 B2 | 5/2004 | Todd et al. | |
| 6,751,556 B2 | 6/2004 | Schroeder et al. | |
| 6,896,058 B2 | 5/2005 | Munoz, Jr. et al. | |
| 6,929,070 B2 * | 8/2005 | Fu et al. | 166/308.2 |
| 6,971,448 B2 | 12/2005 | Slabaugh et al. | |
| 6,983,798 B2 | 1/2006 | Todd | |
| 6,994,166 B2 | 2/2006 | Huang et al. | |
| 7,036,587 B2 | 5/2006 | Munoz, Jr. et al. | |
| 7,036,588 B2 | 5/2006 | Munoz, Jr. et al. | |
| 7,055,604 B2 | 6/2006 | Jee et al. | |
| 7,080,688 B2 | 7/2006 | Todd et al. | |
| 7,086,484 B2 | 8/2006 | Smith, Jr. | |
| 7,096,947 B2 | 8/2006 | Todd et al. | |
| 7,172,022 B2 | 2/2007 | Reddy et al. | |
| 7,195,068 B2 | 3/2007 | Todd | |
| 7,211,548 B2 | 5/2007 | Munoz, Jr. et al. | |
| 7,273,099 B2 * | 9/2007 | East et al. | 166/280.1 |
| 7,281,583 B2 | 10/2007 | Whitfill et al. | |
| 7,353,879 B2 | 4/2008 | Todd et al. | |
| 7,497,258 B2 * | 3/2009 | Savery et al. | 166/292 |
| 8,016,034 B2 | 9/2011 | Glasbergen et al. | |
| 2001/0053749 A1 | 12/2001 | Cowan et al. | |
| 2004/0261996 A1 | 12/2004 | Munoz, Jr. et al. | |
| 2005/0059557 A1 * | 3/2005 | Todd et al. | 507/110 |
| 2005/0161220 A1 | 7/2005 | Todd et al. | |
| 2006/0014648 A1 * | 1/2006 | Milson et al. | 507/213 |
| 2006/0118301 A1 * | 6/2006 | East et al. | 166/280.2 |
| 2006/0175059 A1 | 8/2006 | Sinclair et al. | |
| 2006/0185848 A1 | 8/2006 | Surjaatmadja et al. | |
| 2006/0254774 A1 | 11/2006 | Saini et al. | |
| 2006/0276345 A1 | 12/2006 | Todd et al. | |
| 2006/0283597 A1 | 12/2006 | Schriener et al. | |
| 2007/0032386 A1 * | 2/2007 | Abad et al. | 507/201 |
| 2007/0078064 A1 | 4/2007 | Munoz, Jr. et al. | |
| 2007/0169935 A1 | 7/2007 | Akbar et al. | |
| 2007/0281868 A1 * | 12/2007 | Pauls et al. | 507/213 |
| 2008/0027157 A1 | 1/2008 | Munoz et al. | |
| 2008/0227672 A1 | 9/2008 | Crews et al. | |
| 2008/0269081 A1 | 10/2008 | Lin et al. | |
| 2009/0062157 A1 | 3/2009 | Munoz, Jr. et al. | |
| 2010/0212906 A1 | 8/2010 | Fulton et al. | |
| 2011/0005753 A1 * | 1/2011 | Todd et al. | 166/282 |
| 2011/0048708 A1 | 3/2011 | Glasbergen et al. | |

FOREIGN PATENT DOCUMENTS

WO    WO 2011/027100 A2    3/2011

OTHER PUBLICATIONS

International Search Report and Written Opinion for PCT/GB2010/001337 dated Sep. 30, 2010.

Notice of Allowance and Notice of Allowability for U.S. Appl. No. 12/551,713 dated Jul. 28, 2011.

International Search Report and Written Opinion for PCT/GB2010/001628 dated May 11, 2011.

Glasbergen, et al.; Real-Time Diversion Quantification and Optimization Using DTS; Society of Engineers; 2007 SPE Annual Technical Conference and Exhibition; Anaheim, CA 11-4 Nov. 2007; SPE 110707.

Crowe, C.W.; Evaluation of Oil Soluble Resin Mixtures as Diverting Agents for Matrix Acidizing; 46th Annual Fall Meeting of the Society of Petroleum Engineers of AIME; New Orleans, LA, Oct. 3-6, 1971, SPE 3505.

Glasbergen et al., Design and Field Testing of a Truly Novel Diverting Agent; 2006 SPE Annual Technical Conference and Exhibition, San Antonio, TX; Sep. 24-27, 2006, SPE 102606.

Halliburton brochure entitled "Stimulation; Guidon AGSsm Service, Revolutionary Diverter Technology Helps Achieve Optimum Results from Acidizing Treatments," Sep. 2005.

(Continued)

*Primary Examiner* — George Suchfield
(74) *Attorney, Agent, or Firm* — Robert A. Kent; McDermott Will & Emery LLP

(57) ABSTRACT

Methods and compositions that include a method comprising: providing a treatment fluid comprising at least a plurality of degradable diverting agents that comprise at least one degradable material selected from the group consisting of a fatty alcohol, a fatty acid salt, a fatty ester, a proteinous material, and a combination thereof; and introducing the treatment fluid into a subterranean formation during a subterranean operation via a well bore.

17 Claims, No Drawings

OTHER PUBLICATIONS

Halliburton brochure entitled "Conformance; OSR-100™ Fluid-Loss Additive," Dec. 2007.
Halliburton brochure "Baroid Fluid Services; BARACARB® Bridging Agent," Product Data Sheet; 2006.
Halliburton brochure "Stimulation, BioVert™ H150 Diverter and Fluid Loss Control Material," Jul. 2008.
Halliburton brochure "Conformance, Matriseal® O Diverting Agent," Dec. 2007.
Halliburton brochure "Stimulation, US Land: Acid Stimulation Optimization; StimWatch® Stimulation Monitoring Service Powered by OptoLog® DTS Technology," 2008.
Gualtieri, Dan; "The Application and Benefits of the StimWatch® Stimulation Monitoring Service; Drilling and Well Technology; Exploration & Production," Oil & Gas Review 2007.
JPT; "Real-Time Fluid Tracking Optimizes Treatment Design, Improves Strategy," Oct. 2006.

* cited by examiner

DEGRADABLE DIVERTING AGENTS AND ASSOCIATED METHODS

BACKGROUND

The present invention relates to degradable diverting agents and their associated methods of use in subterranean treatments. In particular, at least in some embodiments, the present invention relates to degradable diverting agents that comprise fatty alcohols, fatty esters, proteinous materials, or fatty acid salts, and their associated methods of use.

Diverting agents may be used in a variety of subterranean treatments. Such treatments include, but are not limited to, drilling, stimulation treatments (e.g., fracturing treatments, matrix acidizing treatments), and cementing operations. For example, after a well bore is drilled and completed in a subterranean producing zone, it is often necessary to introduce a treatment fluid into the zone. For example, a producing zone can be stimulated by introducing an aqueous acid solution into the matrix of a producing zone to dissolve formation material or materials near the wellbore which impede well productivity, and thereby increase its porosity and permeability. This results in an increase in the production of hydrocarbons therefrom. To insure that the producing zone is contacted by the treating fluid uniformly, a particulate solid diverting agent may be placed in the zone to direct the placement of a desired treatment fluid. One technique has been to pack the diverting agent in perforation tunnels extending from the well bore into the subterranean zone. The diverting agent in the perforation tunnels causes the treating fluid introduced therein to be uniformly distributed between all of the perforations whereby the subterranean zone is uniformly treated. The term "zone," as used herein, simply refers to a portion of the formation and does not imply a particular geological strata or composition.

Traditional diverting agents may be grouped into two classifications. Such classifications include viscous fluid diverting agents and physical/mechanical diverting agents. In the former, typically, a relatively high viscosity fluid flows into a subterranean zone, creating a resistance that causes subsequent treatment fluids to be diverted to other portions of the formation. Such diversion methods are considered relatively easy to implement, but are generally thought not to be as effective as diverting agents that introduce a physical or mechanical barrier. Additionally, high temperatures associated with wells of greater depth lead to increased instability of such viscosified fluids.

Diverting agents which work by forming a physical barrier to flow may include perforation ball sealers and particulate diverters. Commonly used particulate diverting agents may be nondegradable or degradable. Most commercially available ball sealers are either a solid material or will have a solid, rigid core comprising materials that are stable under downhole conditions, and thus, following a treatment, need to be recovered from the well bore or otherwise removed from the treatment interval. This clean-up activity delays, complicates and adds expense to the well treatment process. An additional limitation of the use of perforation ball sealers is that they are only applicable in cased, perforated well bores; they are not applicable to other well completion scenarios such as open hole or with a slotted liner.

Particulate diverting agents often are suspended or dissolved in a carrier fluid until that fluid is saturated with the agents and excess material exists, and this fluid is introduced to the subterranean formation during the stimulation treatment. Traditional examples of particulate diverting agents are inorganic materials such as rock salts and polymeric materials such as starch and polyesters etc. The particulate materials typically form a seal in the subterranean formation (e.g., by packing off perforation tunnels, plating off a formation surface, plating off a hole behind a slotted liner, or packing along the surface of a hydraulic fracture), causing the treatment fluid to be diverted uniformly to other portions of the formation. If nondegradable diverting agents are used, the particulate solid diverting agent often is removed from the perforation tunnels or hole to allow the maximum flow of produced fluids that comprise hydrocarbons from the subterranean zone to flow into the well bore. Subsequent operations necessary for removing such diverting agents often entail considerable time and expense and added complications.

SUMMARY

The present invention relates to degradable diverting agents and their associated methods of use in subterranean treatments. In particular, at least in some embodiments, the present invention relates to degradable diverting agents that comprise fatty alcohols, fatty esters, proteinous materials, or fatty acid salts, and their associated methods of use.

In one embodiment, the present invention provides a method comprising: providing a treatment fluid comprising at least a plurality of degradable diverting agents that comprise at least one degradable material selected from the group consisting of a fatty alcohol, a fatty acid salt, a fatty ester, a proteinous material, and a combination thereof; and introducing the treatment fluid into a subterranean formation during a subterranean operation via a well bore.

In another embodiment, the present invention provides a method comprising: providing a drilling fluid comprising at least a plurality of degradable diverting agents that comprise at least one degradable material selected from the group consisting of a fatty alcohol, a fatty acid salt, a fatty ester, a proteinous material, and a combination thereof; and drilling a well bore in a subterranean formation in an operation involving the drilling fluid.

In yet another embodiment, the present invention provides a method comprising: providing a fracturing fluid comprising at least a plurality of degradable diverting agents that comprise at least one degradable material selected from the group consisting of a fatty alcohol, a fatty acid salt, a fatty ester, a proteinous material, and a combination thereof; and placing the fracturing fluid comprising the diverting agent at a pressure sufficient to create or enhance a fracture in a portion of the formation.

In yet another embodiment, the present invention provides a method comprising: providing a treatment fluid comprising at least a plurality of degradable diverting agents that comprise at least one degradable material selected from the group consisting of a fatty alcohol, a fatty acid salt, a fatty ester, a proteinous material, and a combination thereof; introducing the treatment fluid into a subterranean formation during a subterranean operation via a well bore; allowing the degradable diverting agent to divert the flow of at least a portion of a second treatment fluid comprising an acid from a first location within the well bore to a second location within the well bore; and allowing the acid to interact with a portion of the formation to form an acidized portion of the formation.

The features and advantages of the present invention will be apparent to those skilled in the art. While numerous changes may be made by those skilled in the art, such changes are within the spirit of the invention.

DESCRIPTION OF THE PREFERRED EMBODIMENTS

The present invention relates to degradable diverting agents and their associated methods of use in subterranean treatments. In particular, at least in some embodiments, the present invention relates to degradable diverting agents that comprise fatty alcohols, fatty esters, proteinous materials, or fatty acid salts, and their associated methods of use.

Of the many potential advantages of the present invention (many of which are not alluded to herein), these degradable diverting agents may be used in a variety of subterranean applications and may remain stable and competent across a wide temperature range. The degradable diverting agents may be used in subterranean applications involving temperature ranges of up to 250° F. or more, depending on the particular composition employed. Some of the disclosed materials have higher melting temperatures and may be used in higher temperature applications, for example, up to 400° F. or more in some instances. The temperature limitations of the system may depend on the melting points of the degradable material used in the degradable diverting agents of the present invention and the conditions, such as the bottom hole temperature of the well in which these materials will be used. In some instances, the degradable diverting agents of the present invention may be used in wells comprising depths of greater than 15,000 ft. Moreover, the degradable diverting agents of the present invention may degrade in a predictable manner so as to optimize reservoir productivity. Once degraded, the degradable diverting agents of the present invention should not leave an undesirable residue in the formation.

In addition to acting as diverting agents, in some embodiments, the degradable diverting agents of the present invention may be used to control fluid loss of a fluid into a subterranean formation from a well bore penetrating the subterranean formation. The term "fluid loss," as used herein, relates to the loss of volume of a treatment fluid to a portion of the subterranean formation through, for example, the pore space or the natural fractures of the formation, that surrounds a well bore or a hydraulic fracture. In an embodiment, the degradable diverting agents of the present invention may act to at least partially control fluid migration within the subterranean formation. Preferably, the degradable diverting agents enable a seal to form across an entire area of placement in a subterranean formation. Note, however, that if the size of degradable diverting material is large, the material may attach to the face of the formation without completely filling or sealing the porosity of the formation. In using the degradable diverting agents of the present invention in fracturing or other treatment processes, the degradable diverting agents inter alia may act by seating themselves in the perforations in the well bore casing and deflecting the treating fluid to unsealed portions of the perforated interval. In certain embodiments, the seal formed by the degradable diverting agents of the present invention may be a partial seal, leaving a portion of the formation unsealed. The term "partial seal," as used herein, may mean any seal formed that seals off less than 100% of fluid flow to a portion of a subterranean formation. In other embodiments, if the size of the degradable diverting material is small, the degradable diverting material may prevent fluid loss into the formation by becoming lodged into the pores or forming a bridge between at least two pore throats.

The term "degradable" as used herein in reference to the degradable diverting agent of the present invention means that the diverting agent is degradable due, inter alia, to chemical and/or radical degradation processes such as hydrolysis or oxidation. The term "degrade", as used herein, means to lower in character or quality; to debase. For example, the diverting agent may be said to have degraded when it has undergone a chemical breakdown. Methods of degradation can include melting, hydrolysis, solventolysis, oxidation, or complete dissolution. In some embodiments, the degradable diverting agents of the present invention may degrade in a time period ranging from about 1 hour to 72 hours.

The degradable diverting agents of the present invention are useful in subterranean operations, for example, to seal off geologic zones during drilling, hydraulic fracturing, acidizing stimulation treatments, or for any other fluid injection treatment, typically for the purpose of diverting flow of the treatment fluid to other zones of interest within the formation. In using the degradable diverting agents of the present invention in matrix acidizing, fracturing, or other treatment processes, the degradable diverting agents, inter alia, are thought to act by deflecting the treating fluid to unsealed portions of the formation. The term "stimulation", as used herein, refers to productivity improvement or restoration operations on a well as a result of a hydraulic fracturing, acid fracturing, matrix acidizing, sand treatment, or other type of treatment intended to increase and/or maximize the well's production rate or its longevity, often by creating highly conductive reservoir flow paths. The degradable diverting agents then degrade over time (depending on dissolution, melting point, and conditions), and generally do not require an additional step of retrieving them from the well bore. The degradable diverting agents of the present invention may be degradable in formation fluids, including hydrocarbon and aqueous fluids, to facilitate self-cleanup after service. This is another advantage of the degradable diverting agents of the present invention in that other degradable diverting agents, such as those made from polylactic acid, are thought to be relatively difficult to degrade in hydrocarbon-based fluids.

As used herein, the term "treatment," or "treating," refers to any subterranean operation performed in conjunction with a desired function and/or for a desired purpose. The term "treatment," or "treating," does not imply any particular action.

As used herein, the term "treatment fluid" refers generally to any fluid that may be used in a subterranean application in conjunction with a desired function and/or for a desired purpose. The term "treatment fluid" does not imply any particular action by the fluid or any component thereof.

In some embodiments, before being placed in a treatment fluid, the degradable diverting agents of the present invention may be in a powder form with a diameter in the range of about 10 nanometers to about ¼ inches. In other embodiments, the degradable diverting agents may be suspended in a carrier fluid (e.g., drilling fluid, fracturing fluid, acidizing fluid). The term "carrier fluid" as used herein refers to oil or water based fluid. A carrier fluid may or may not be the same as a treatment fluid in a given context and may be of a small volume relative to the volume of treatment fluid to be used. The term also encompasses carrier fluids that are comprised of gases such as carbon dioxide or nitrogen in large or small concentrations.

In some embodiments, the properties of the degradable diverting agents of the present invention should be chosen so that the degradable materials have a density from about 0.70 g/cc to about 1.5 g/cc. In various embodiments, the degradable diverting agents of the present invention may have densities in the range of about 0.7 g/cc, about 0.75 g/ccf, about 0.8 g/cc, about 0.85 g/cc, about 0.9 g/cc, about 0.95 g/cc, about 1 g/cc, about 1.1 g/cc, about 1.2 g/cc, about 1.3 g/cc, about 1.4 g/cc, and about 1.5 g/cc, as well as densities and density ranges between any two of these values, e.g., a density from about 0.8 g/cc to about 1.1 g/cc, or a density of about 1.05 g/cc.

The degradable diverting agents of the present invention comprise at least one degradable material selected from the group consisting of fatty alcohols, fatty acid salts, fatty esters, proteinous materials, and combinations thereof. The melting points and solubilities in the following are from the HANDBOOK OF AQUEOUS SOLUBILITY DATA, by Samuel H. Yalkowsky and Yan He, Publisher: CRC Press, 2003. These materials may be used in any mixture or combination in the degradable diverting agents of the present invention.

Suitable fatty alcohols and fatty esters and that may be used in the degradable diverting agents of the present invention include, but are not limited to, such fatty alcohols and esters as: montanyl alcohol (which has a melting point of 83° C. (171° F.)); tert-butylhydroquinone (which has a melting point of 128° C. (262° F.), and is insoluble in water); cholesterol (which has a melting point of 149° C. (300° F.), and has a solubility of 0.095 mg/L of water at 30° C. (86° F.)); cholesteryl nonanoate (which has a melting point of about 80° C. (176° F.), and is insoluble in water); benzoin (which has a melting point of about 137° C. (279° F.), and is slightly insoluble in water); borneol (which has a melting point of about 208° C. (406° F.), and is slightly insoluble in water); exo-norborneol (which has a melting point of 125° C. (257° F.) glyceraldehyde triphenylmethanol (which has a melting point of 164.2° C. (324° F.), and is insoluble in water); propyl galleate (which has a melting point of 150° C. (302° F.)); and dimethyl terephthalate ("DMT") (which has a melting point of 141° C. (286° F.), and limited solubility in water which is more soluble than "slightly"). If solubilities are not given in this listing, then that data is not available to the inventors at the present time. Any combinations, derivatives, or mixtures of these may be suitable as well.

The fatty alcohols may also include, as representative examples: camphor ($C_{10}H_{16}O$, with a melting point of about 180° C. (356° F.), slightly soluble in water); cholecalciferol (a.k.a. vitamin D3, $C_{27}H_{44}O$, with a melting point of about 85° C. (185° F.), slightly soluble in water); ricinoleyl alcohol ($C_{18}H_{36}O_2$, with a melting point of about 89° C. (192° F.)); 1-heptacosanol ($C_{27}H_{56}O$, with a melting point of about 82° C. (180° F.)); 1-tetratriacontanol (a.k.a. geddyl alcohol $C_{34}H_{70}O$, with a melting point of about 92° C. (198° F.)); 1-dotriacontanol (lacceryl alcohol, $C_{32}H_{66}O$, with a melting point of about 89° C. (192° F.)); 1-hentriacontanol (melissyl alcohol, $C_{31}H_{64}O$, with a melting point of about 87° C. (189° F.)); 1-tricontanol (myricyl alcohol, $C_{30}H_{62}O$, with a melting point of about 87° C. (189° F.)); 1-nonacosanol ($C_{29}H_{60}O$, with a melting point of about 85° C. (185° F.)); 1-octasanol (a.k.a montanyl alcohol, $C_{28}H_{58}O$, with a melting point of about 84° C. (183° F.)); 1-hexacosanol (ceryl alcohol, $C_{26}H_{54}O$, with a melting point of about 81° C. (178° F.)); 1,14-tetradecanediol ($C_{14}H_{30}O_2$, with a melting point of about 85° C. (185° F.)); 1,16-hexadecanediol, ($C_{16}H_{34}O_2$, with a melting point of about 91° C. (196° F.)); 1,17-heptadecanediol ($C_{18}H_{36}O_2$, with a melting point of about 96° C. (205° F.)); 1,18-octadecanediol ($C_{19}H_{38}O_2$, with a melting point of about 98° C. (208° F.)); 1,19-nonadecanediol ($C_{20}H_{40}O_2$, with a melting point of about 101° C. (214° F.)); 1,20-eicosanediol ($C_{20}H_{42}O_2$, with a melting point of about 102° C. (216° F.)); 1,21-heneicosanediol ($C_{21}H_{44}O_2$, with a melting point of about 105° C. (221° F.)); and 1,22-docosanediol ($C_{22}H_{46}O_2$, with a melting point of about 106° C. (223° F.)). Any combinations, derivatives, or mixtures of these may be suitable as well.

The described fatty esters are generally reaction products of alcohols and acids. Examples include, but are not limited to, prednisolone acetate ($C_{26}H_{36}O_6$, M.P. 233° C. (451° F.), slightly soluble in water), cellobiose tetraacetate (slightly soluble in water), terephthalic acid dimethyl ester, ($C_{10}H_{10}O_4$, M.P. 140° C. (284° F.), slightly soluble in water). Other examples of esters can be found in ester waxes such as carnauba wax and ouricouri wax. Carnauba wax comprises ceryl palmitate, myricyl ceretate, and myricyl alcohol ($C_{30}H_{61}OH$) along with other high molecular weight esters and alcohols. Olho wax is a pure whitish gray carnauba wax obtained from young leaves. Other waxes that can be used include the following. Refined olho wax is also known as flora wax. Palha wax is a brownish wax obtained from older leaves. Palha wax can be emulsified with water to form chalky wax. Castor wax like compound obtained by the controlled hydrogenation of pure castor oil. The principle constituent is glycerol tris 12-hydroxystearate, also known as opalwax with a melting point in the range from about 78° C. (172° F.) to about 85° C. (185° F.). Any combinations, derivatives, or mixtures of these may be suitable as well.

Suitable proteinous materials may also be used in the present invention. The term "proteinous materials", as used herein, relates to any of a group of complex organic macromolecules that contain carbon, hydrogen, oxygen, nitrogen, and/or sulfur and are composed of one or more chains of amino acids. Prolamins are a group of plant storage proteins having a high proline and glutamine content and can be found in the seeds of cereal grains. The prolamins that are suitable for use in the degradable diverting agents of the present invention include, but are not limited to, such prolamins as: gliadin, hordein, secalin, zein, avenin, and combinations thereof. Prolamins are generally soluble only in strong alcohol solutions and have a melting point in the range from about 160° C. (320° F.) to about 200° C. (392° F.).

The fatty acid salts that are suitable for use in the degradable materials of the present invention include, but are not limited to, such fatty acid salts as: sucrose distearate, calcium stearate, glyceryl monostearate, zinc stearate and magnesium stearate (which is a hydrophobic substance with a melting point of 88° C. (190° F.)).

In accordance with the present invention, and in order to optimize the properties of the degradable diverting agents of the present invention, fatty alcohols, fatty acid salts, fatty esters, proteinous materials, and combinations thereof may be present in such a weight ratio that the desired properties of the final product are achieved by the combination. In some embodiments, each component may be present at least 0.1-150% by weight.

In an additional embodiment, the degradable diverting agents of the present invention may be used in conjunction with conventional diverting materials. Nonlimiting examples of degradable diverting material that may be used in conjunction with the methods of the present invention may include, but are not limited to, degradable polymers. One suitable commercially available lightweight diverting material is a product known as "BIOVERT," which is available from Halliburton Energy Services headquartered in Duncan, Okla. BIOVERT is a polymer material comprising polylactide and having a specific gravity of about 1.25. Other suitable diverting materials may include, but are not limited to, rock salt, naphthalene, clean tar, starch, and moth balls.

The degradable diverting agents of the present invention may be used in conjunction with other types of degradable diverting agents, such as those derived from aliphatic polyesters and those that comprise dehydrated compounds such as those described below. Suitable examples of degradable polymers that may be used in accordance with the present invention include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly(ε-caprolactone); poly(hydroxybutyrate); poly(anhydrides); aliphatic polycarbonates; poly(ortho esters); poly(amino acids); poly (ethylene oxide); and polyphosphazenes. Polyanhydrides are another type of particularly suitable degradable polymer useful in the present invention. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

One skilled in the art will recognize that plasticizers may be included in forming the degradable diverting agents of the present invention. The plasticizers may be present in an amount sufficient to provide the desired characteristics, for example, increased compatibility of the melt blend components, improved processing characteristics during the blending and processing steps, and control and regulation of the sensitivity and degradation of the polymer by moisture.

The degradable diverting agents of the present invention may comprise a dehydrated compound. Suitable dehydrated compounds are those materials that will degrade over time when rehydrated. For example, a particulate solid dehydrated salt or a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid.

The degradable diverting agents of the present invention, as described herein, are degradable, for example, following completion of their use in preventing fluid loss by sealing off a portion of a zone within the formation or in facilitating the degradation of filter cakes or drilling muds. The term "fluid loss", as used herein, relates to the loss of volume of a treatment fluid to a portion of the subterranean formation through, for example, the pore space or the natural fractures of the formation, that surrounds a well bore or a hydraulic fracture.

The degradable diverting agents of the present invention may break-down after a period of time and dissolve in well bore fluids, thereby minimizing and/or eliminating problems during reservoir fluid production and with further well bore stimulations, further use of aqueous well bore treatment fluids, and well stimulation equipment. These degradable diverting agents of the present invention, according to the present invention, are soluble in, for example, aqueous base fluids as well as hydrocarbon fluids, under both acidic, neutral, and basic pH environments. Suitable hydrocarbon fluids which the degradable diverting agents of the present invention are soluble in include diesel, kerosene, reservoir oil, and mixtures thereof. By "acidic pH," it is meant that the environment surrounding the ball sealers (e.g., the treating fluid) has a pH less than about 7, while by "neutral pH" it is meant that the environment surround the ball sealers has a pH of about 7 and "basic pH" means a pH of above about 7.

In an embodiment of the present invention, the degradable diverting agents may be formed into particles of selected sizes and shapes. That is, the degradable diverting material polymer may be dissolved in a solvent such as water, alcohols, acetone, methylene chloride, trichloroethylene, chloroform, cyclohexane, methylene diiodide, mixtures thereof and the like. The solvent may then be removed to form a solid material which can be formed into desired particle sizes. Alternatively, the degradable diverting agents may precipitate out of the solution by a change in temperature. Fatty acid salts and esters maybe obtained by reacting fatty acids with hydroxyl-containing ols or metal hydroxides. Fine powders can also be admixed and then granulated or pelletized to form mixtures having any desired particle sizes. In an embodiment, the degradable material may be formed into particulates with a size ranging from about 10 nanometers to about one-quarter of an inch in diameter.

The degradable diverting agents of the present invention may be used in any subterranean application in which it is desirable to divert the flow of a fluid to or from a chosen location. The degradable diverting agents of the present invention also may be used in any subterranean application in which it is desirable to control fluid loss into the subterranean formation. Specific nonlimiting examples of suitable subterranean applications include drilling, stimulation, and completion operations.

The degradable diverting agents of the present invention can be introduced into the formation using any suitable treatment fluid that is applicable to the chosen operation. Examples of suitable treatment fluids include any known subterranean treatment fluid, including those in high volume and those that are lower in volume (e.g., pills). Nonlimiting examples of the types of suitable treatment fluids include foams, gases, aqueous-based fluids, oil-based fluids, brines, and combinations thereof (such as emulsions). These fluids may comprise any additives that may be necessary for the fluid to perform the desired function or task, providing that these additives do not negatively interact with the degradable diverting agents of the present invention. Such additives may include gelling agents, gel stabilizers, salts, pH-adjusting agents, corrosion inhibitors, dispersants, flocculants, acids, foaming agents, antifoaming agents, $H_2S$ scavengers, lubricants, particulates (e.g., proppant or gravel), bridging agents, weighting agents, scale inhibitors, biocides, friction reducers, and the like. Suitable additives for a given application will be known to one of ordinary skill in the art. In certain embodiments, the addition of such additives to the treatment fluids of the present invention may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing. In some embodiments of the present invention, these suitable additives may be mixed into the treatment fluid comprising the degradable diverting agents of the present invention on the fly.

In one embodiment, the present invention provides a method comprising: providing a treatment fluid comprising a degradable diverting agent that comprises at least one degradable material selected from the group consisting of a fatty alcohol, a fatty acid salt, a fatty ester, a proteinous material, and a combination thereof; introducing the treatment fluid to the subterranean formation during a subterranean operation via a well bore; and allowing the a degradable diverting agent to divert the flow of at least a portion of a second treatment fluid from a first location within the well bore to a second location within the well bore.

The term "introducing", as used herein, includes pumping, injecting, pouring, releasing, displacing, spotting, circulating, or otherwise placing a fluid or material within a well, well bore, or subterranean formation using any suitable manner known in the art.

In another embodiment, the degradable diverting agents of the present invention may advantageously be used to divert a treatment fluid from one zone in a subterranean formation to another, and may then be degraded in the subterranean formation without the need for an additional step of removing the diverting material.

In another embodiment, the degradable diverting agents of the present invention may interact with the surface of a portion of the subterranean formation so as to prevent the loss of a treatment fluid from the well bore into that portion of the subterranean formation. In certain embodiments, the degradable diverting agents may form a filter cake or part of a filter cake to prevent fluid loss from the well bore into the subterranean formation.

In an embodiment, the degradable diverting agents of the present invention may be used to divert a fracturing fluid to untreated perforations in order to create a plurality of fractures in the subterranean formation. In another embodiment, the diverting agents of the present invention may be used during a fracturing treatment as a curative to prevent further fluid loss. The degradable diverting agents of the present invention may be added directly to the fracturing fluid or as a pre-pad fluid before the fracturing fluid is placed in the subterranean formation.

In other embodiments, treatment fluids that can utilize the degradable diverting agents of the present invention include, but are not limited to pills (such as inside screen pills), which are fluids with a relatively small quantity (e.g., less than 200 bbl) of a special blend of drilling fluid to accomplish a specific task that the regular drilling fluid cannot perform. Examples include high-viscosity pills to help lift cuttings out of a vertical well bore, freshwater pills to dissolve encroaching salt formations, pipe-freeing pills to destroy filter cake and relieve differential sticking forces, and lost circulation material pills to plug a thief zone. Other examples include pills that may be placed in completion fluids to temporarily seal off surfaces of the formation.

In certain embodiments, the degradable diverting agents of the present invention may advantageously be used to divert an acidizing fluid from one zone in a subterranean formation to another. In an acidizing embodiment, the degradable diverting agents of the present invention may range in size from about 10 nanometers to about 1 mm depending on the pore throat size in the zone of interest. The amount of diverting agent added to an acidizing treatment may range from about 5 lbs to about 300 lbs per thousand gallons of carrier fluid. After acidization is completed, the water and salts dissolved therein may be recovered by producing them to the surface (e.g., "flowing back" the well), leaving a desirable amount of voids within the formation, which may enhance the formation's permeability and/or increase the rate at which hydrocarbons subsequently may be produced from the formation. In an embodiment, the diversion materials of the present invention may divert an acidizing fluid away from a wormhole in a carbonate formation that is growing too rapidly, allowing the acidization process to become more efficient. In another embodiment, the diversion materials of the present invention may be used to divert an acidizing treatment fluid away from a high-permeability "thief" zone in a subterranean formation to another lower-permeability zone, and may allow for a more efficient acidizing treatment of the entire producing interval.

In an embodiment, the diverting materials of the present invention may be added to temporarily divert the cementing fluids from a particular zone to a desired zone within the subterranean formation in order to prevent loss of circulation of the cementing fluids.

At a desired time, the degradable diverting material may at least partially degrade, allowing the formation fluids to be produced. The degradable diverting materials may degrade according to a variety of mechanisms depending on factors such as well bore conditions (e.g., bottom hole temperature, fluid composition, depth, pressure, etc.), and any externally introduced fluids or chemicals. For example, some of the polymeric compositions useful as degradable diverting materials may degrade in water released from the formation or introduced during a treatment. When the degradable diverting material is self-degradable, the degradable diverting material may at least partially degrade heated in the subterranean zone. If the subterranean formation does not contain water that may be released, an aqueous fluid may be introduced into the formation to aid in degradation of the diverting material. For example, salt water, sea water, or steam may be introduced into the subterranean formation to aid in the degradation of the degradable diverting material. Thus the degradable diverting material may be suitable even when non-aqueous treating fluids are utilized or when an aqueous treating fluid has dissipated within the formation or when an aqueous fluid has otherwise been removed from the formation such as by flowback. In an embodiment, a chemical composition may be introduced into the formation to aid in the degradation of the degradable diverting material. Suitable compositions may include, but are not limited to, acidic fluids, basic fluids, solvents, steam, or a combination thereof.

In embodiments of degradable diverting agents of the present invention, single and multiple intervals of a subterranean formation can be treated or stimulated in stages by successively introducing the degradable diverting agents of the present invention. This is accomplished through sequential injection of treatment fluid stages interspersed with fluid stages containing the degradable diverting materials, such that early fluid stages treat one or more intervals which are then sealed off with one injection of diverting agents, and subsequent intervals are treated and then sealed with continued alternating injection of treatment fluids and diverting agents.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques. While compositions and methods are described in terms of "comprising" various components or steps, the compositions and methods can also "consist essentially of" or "consist of" the various components and steps. When "comprising" is used in a claim, it is open-ended.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A method comprising:
   providing a treatment fluid comprising at least a plurality of degradable diverting agents that comprise at least one degradable fatty alcohol, and
   introducing the treatment fluid into a subterranean formation during a subterranean operation via a well bore.

2. The method of claim 1 further comprising allowing at least one of the degradable diverting agents to divert the flow of at least a portion of the treatment fluid or a portion of a second treatment fluid from a first location within the well bore to a second location within the well bore.

3. The method of claim 2 wherein the second treatment fluid is a cementing fluid, a fracturing fluid, or an acidizing fluid.

4. The method of claim 1 wherein at least one of the degradable diverting agents comprises at least one fatty alcohol selected from the group consisting of: a montanyl alcohol, a tert-butylhydroquinone, a cholesterol, a cholesteryl nonanoate, a benzoin, a borneol, an exo-norborneol, a glyceraldehyde triphenylmethanol, a dimethyl terephthalate, a camphor, a cholecalciferol, a ricinoleyl alcohol, a 1-Heptacosanol, a 1-Tetratriacontanol, a 1-Dotriacontanol, a 1-Hentriacontanol, a 1-Tricontanol, a 1-Nonacosanol, a 1-Octasanol, a 1-Hexacosanol, a 1,14-Tetradecanediol, a 1,16-Hexadecanediol, a 1,17-Heptadecanediol, a 1,18-Octadecanediol, a 1,19-Nonadecanediol, a 1,20-Eicosanediol, a 1,21-Heneicosanediol, a 1,22-Docosanediol, a myricyl alcohol, and any combination thereof.

5. The method of claim 1 wherein the treatment fluid comprises a foam, a gas, an aqueous-based fluid, an oil-based fluid, a brine, and any combination thereof.

6. The method of claim 1 wherein the treatment fluid further comprises at least one other diverting agent selected from the group consisting of:
   a rock salt, a napthalene, a clean tar, a starch, a moth ball, a dextran, a cellulose, a chitin, a chitosan, a protein, an aliphatic polyester, a poly(lactide), a poly(glycolide), a poly(ε-caprolactone), a poly(hydroxybutyrate), a poly(anhydride), an aliphatic polycarbonate, a poly(orthoester), a poly(amino acid), a poly(ethylene oxide), a polyphosphazene, a poly(adipic anhydride), a poly(suberic anhydride), a poly(sebacic anhydride), a poly(dodecanedioic anhydride), a poly(maleic anhydride) and a poly(benzoic anhydride), and any combination thereof.

7. The method of claim 1 wherein the treatment fluid further comprises at least one additive selected from the group consisting of: a gelling agent, a gel stabilizer, a salt, a pH-adjusting agent, a corrosion inhibitor, a dispersant, a flocculant, an acid, a foaming agent, an antifoaming agent, a $H_2S$ scavenger, a lubricant, a particulate, a bridging agent, a weighting agent, a scale inhibitor, a biocide, a friction reducer, and any combination thereof.

8. The method of claim 1 wherein at least a portion of the degradable diverting agents form a seal in the subterranean formation by attaching to a fracture face in a portion of the subterranean formation, by filling the pores of a portion of the subterranean formation, and/or by creating a bridge for at least two pore throats in a portion of the subterranean formation.

9. The method of claim 1 wherein the subterranean formation has a temperature in a range of about 257° F. to about 400° F.

10. A method comprising:
    providing a drilling fluid comprising at least a pluralilty of degradable diverting agents that comprise at least one degradable fatty alcohol; and
    drilling a well bore in a subterranean formation in an operation involving the drilling fluid.

11. The method of claim 10 further comprising allowing at least one of the degradable diverting agent to divert the flow of at least a portion of the drilling fluid or at least a portion of a second treatment fluid from a first location within the well bore to a second location within the well bore.

12. The method of claim 10 wherein at least one of the degradable diverting agent comprises at least one fatty alcohol selected from the group consisting of: a montanyl alcohol, a tert-butylhydroquinone, a cholesterol, a cholesteryl nonanoate, a benzoin, a borneol, an exo-norborneol, a glyceraldehyde triphenylmethanol, a dimethyl terephthalate, a camphor, a cholecalciferol, a ricinoleyl alcohol, a 1-Heptacosanol, a 1-Tetratriacontanol, a 1-Dotriacontanol, a 1-Hentriacontanol, a 1-Tricontanol, a 1-Nonacosanol, a 1-Octasanol, a 1-Hexacosanol, a 1,14-Tetradecanediol, a 1,16-Hexadecanediol, a 1,17-Heptadecanediol, a 1,18-Octadecanediol, a 1,19-Nonadecanediol, a 1,20-Eicosanediol, a 1,21-Heneicosanediol, a 1,22-Docosanediol a myricyl alcohol, and any combination thereof.

13. A method comprising:
    providing a fracturing fluid comprising at least a plurality of degradable diverting agents that comprise at least one degradable fatty alcohol; and
    placing the fracturing fluid comprising the diverting agent at a pressure sufficient to create or enhance a fracture in a portion of the formation.

14. The method of claim 13 further comprising allowing at least one of the degradable diverting agents to divert the flow of at least a portion of the fracturing fluid or at least a portion of a second treatment fluid from a first location within the well bore to a second location within the well bore.

15. The method of claim 13 wherein at least one of the degradable diverting agents comprises at least one fatty alcohol selected from the group consisting of: a montanyl alcohol, a tert-butylhydroquinone, a cholesterol, a cholesteryl nonanoate, a benzoin, a borneol, an exo-norborneol, a glyceraldehyde triphenylmethanol, a dimethyl terephthalate, a camphor, a cholecalciferol, a ricinoleyl alcohol, a 1-Heptacosanol, a 1-Tetratriacontanol, a 1-Dotriacontanol, a 1-Hentriacontanol, a 1-Tricontanol, a 1-Nonacosanol, a 1-Octasanol, a 1-Hexacosanol, a 1,14-Tetradecanediol, a 1,16-Hexadecanediol, a 1,17-Heptadecanediol, a 1,18-Octadecanediol, a 1,19-Nonadecanediol, a 1,20-Eicosanediol, a 1,21-Heneicosanediol, a 1,22-Docosanediol, a myricyl alcohol, and any combination thereof.

16. A method comprising:
   providing a treatment fluid comprising at least a pluralilty of degradable diverting agents that comprise at least one degradable fatty alcohol;
   introducing the treatment fluid into a subterranean formation during a subterranean operation via a well bore;
   allowing the degradable diverting agent to divert the flow of at least a portion of a second treatment fluid comprising an acid from a first location within the well bore to a second location within the well bore; and
   allowing the acid to interact with a portion of the formation to form an acidized portion of the formation.

17. The method of claim 16 wherein the degradable diverting agent comprises at least one fatty alcohol selected from the group consisting of: a montanyl alcohol, a tert-butylhydroquinone, a cholesterol, a cholesteryl nonanoate, a benzoin, a borneol, an exo-norborneol, a glyceraldehyde triphenylmethanol, a dimethyl terephthalate, a camphor, a cholecalciferol, a ricinoleyl alcohol, a 1-Heptacosanol, a 1-Tetratriacontanol, a 1-Dotriacontanol, a 1-Hentriacontanol, a 1-Tricontanol, a 1-Nonacosanol, a 1-Octasanol, a 1-Hexacosanol, a 1,14-Tetradecanediol, a 1,16-Hexadecanediol, a 1,17-Heptadecanediol, a 1,18-Octadecanediol, a 1,19-Nonadecanediol, a 1,20-Eicosanediol, a 1,21-Heneicosanediol, a 1,22-Docosanediol, a myricyl alcohol, and any combination thereof.

* * * * *